Aug. 23, 1960        M. HANIN ET AL        2,949,926
VALVE OPERATED BY THE ACTION OF LIQUID
Filed March 23, 1956
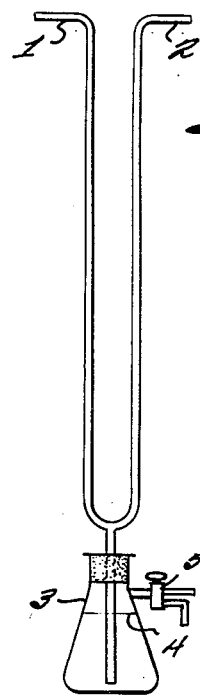
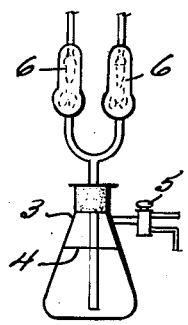
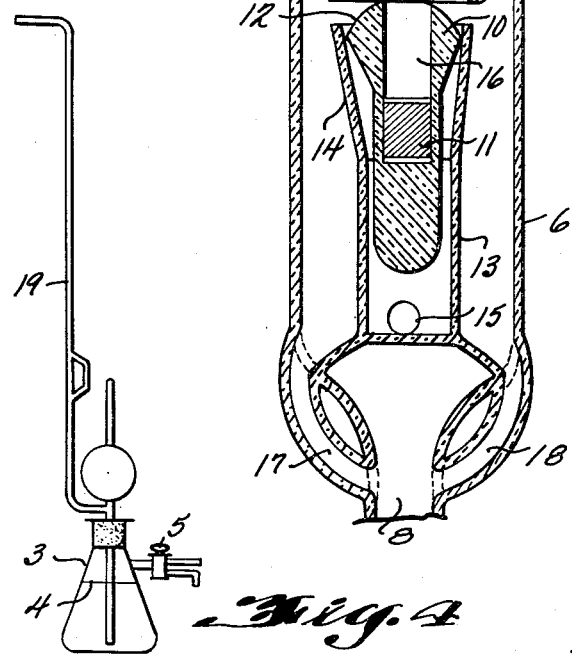
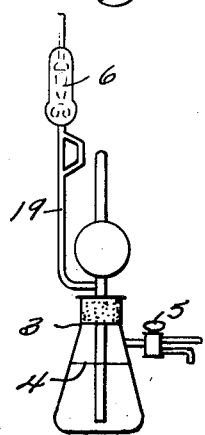
INVENTOR.
MIREILLE HANIN
JACQUES VOELTZEL
BY Irwin S. Thompson
ATTORNEY

2,949,926

VALVE OPERATED BY THE ACTION OF LIQUID

Mireille Hanin and Jacques Voeltzel, Paris, France, assignors to Institut de Recherches de la Siderurgie, Saint-Germain-en-Laye, France, a French professional institution Filed Mar. 23, 1956, Ser. No. 573,437

Claims priority, application France Dec. 5, 1955

1 Claim. (Cl. 137—202)

The present invention relates to a valve operated by the action of liquid, which is intended more particularly, but not exclusively, to replace mercury valves.

When it is desired to separate two parts of an apparatus filled with gas at a pressure lower than or in the vicinity of atmospheric pressure, ground control cocks are used which are of course greased, or valves are used if it is desired to dispense with using grease.

In laboratory apparatus, these valves are generally mercury valves, formed of a U-tube each of whose arms is connected to each of the parts which are to be isolated from one another, a barometric column connecting the two arms of the U to a reservoir of mercury, the level of which can vary under the influence of a vacuum or pressure.

The disadvantage of these devices is that they require the provision of a barometric column of relatively considerable bulk. Moreover they do not allow the ascent of the fluid in one of the arms of the tube to be arrested.

One of the objects of the invention is, more particularly, to provide a mercury valve which plays the same role as already known mercury valves, without its being necessary to provide a barometric column, whilst allowing the ascent of the mercury to be halted and allowing pressure to be reestablished upon descent of the mercury, that is to say, making it possible at this moment to let the gases to flow rapidly from upstream to downstream of the valve.

A more general object of the invention is to construct a valve operated by the action of liquid which does not require the use of the most commonly used mechanical means, whilst ensuring a perfect sealing action. The valve can be employed in industry.

The invention also comprises other features which will become apparent both from the following description and from the accompanying drawings, wherein:

Fig. 1 is a diagrammatic view of a mercury valve of known type;

Fig. 2 is an axial sectional view of a mercury valve according to the invention;

Fig. 3 is a diagrammatic view of two valves according to the invention which are mounted so as to dispense with the barometric column shown in Fig. 1;

Fig. 4 is a diagrammatic view of a McLeod gauge; and

Fig. 5 is a diagrammatic view of a valve according to the invention arranged so as to dispense with the barometric column shown in Fig. 4.

The mercury valve of known type which is shown in Fig. 1 comprises a U-tube whose two arms 1, 2 are each connected, for example, to a reservoir so as to allow gas to be passed from one reservoir to the other when desired. The elbow of the U is provided with an extension which penetrates into a flask 3 filled with mercury 4. In order to cause the valve to operate, the two-way cock 5 is operated so as to make it communicate either with vacuum or with the atmosphere.

The mercury valve illustrated in Fig. 2 advantageously replaces a mercury valve of the aforesaid type. It comprises an envelope 6, preferably made of glass, which is provided with two orifices 7 and 8 whose cross-sections depend on the main conduits of the apparatus which is to be controlled (not shown). Welded to the orifice 7 upstream of the device, is the female element or seating 9, which is preferably made of glass and whose preferably spherical end is precision-ground.

Disposed co-axially with the seating 9 is the male element or valve member 10 forming a float member, which is made of glass, for example, and is preferably provided with a core 11 of soft iron. If this core is magnetised, it allows the float member to be controlled from the outside by means of a magnet or an electro-magnet. The end 12 of the valve member is ground so as to co-operate precisely with the seating 9. The float member 10 is housed in a guide member constituted by a cylindrical tube 13 which terminates in a flared end 14 on which the head of the valve member can rest. The said tube 13 is provided at its lower portion with orifices 15 for allowing the interior of the tube to communicate with the interior of the envelope 6 and to allow the passage of the mercury.

The float member illustrated in Figure 2 is provided with a recess 16, but it could also be solid.

A perfect seal, without the use of grease, is obtained by reason of the fact that the spherical contact cups of the valve member and seating are worked to optical precision standards.

Finally, ducts 17, 18 allow the valve to communicate with the orifice 8 which is connected to the main conduit of the apparatus.

It will be apparent that the valve can be made of any material which is resistant to mercury, provided at the same time that it can be machined with precision. Glass meets these requirements, but the valve could also be made of steel, plastic material, etc.

A valve of the aforesaid type might be actuated by another liquid than mercury. The contact cup seating 9 of the valve and the valve member 10 might be of spherical or conical shape.

Operation is as follows:

When the mercury ascends from downstream to upstream, it enters the body of the valve by the ducts 17, 18, then into the guide of the float member, through the orifices 15, lifts the float member, and the two ground portions come into contact with one another and seal the conduit whilst the body of the valve 6 fills with mercury.

When the mercury is returned to its lower reservoir, it flows rapidly through the orifices 15 and the ducts 17, 18. The float member is released and allows the gas to pass through and flow out through the same orifices.

There is no danger that this valve, which does not require greasing, will soil the entraining liquid, and the presence of the magnetic core allows the valve to be freed by means of a magnetic field if it has become accidentally stuck.

It will be understood from Fig. 3 that two valves of the type described hereinbefore can advantageously replace the mercury valve shown in Fig. 1. Similarly, as can be seen from Fig. 5, a valve of this kind makes it possible to reduce considerably the length of the barometric tube 19 of the McLeod gauge illustrated in Fig. 4. By reason of the principle of operation, the upper utilisation pressure is not limited to the atmospheric pressure on the reservoir 3.

Of course, the form of embodiment described hereinbefore and illustrated in the drawings is given merely by way of non-limitative example, and it will be realised that the form, nature, and assembly of its elements can be modified in any suitable manner without however departing from the spirit of the invention, or the scope of the subjoined claim.

What we claim is:

A valve operated by the action of liquid comprising in combination an envelope having an upstream and a downstream orifice, a first open tubular portion entering said envelope through said upstream orifice, a recessed seating at the lower end of said first tubular portion, a tubular guiding portion co-axial with said first tubular portion entering said envelope through said downstream orifice, the upper end of said tubular guiding portion being flared, said guiding portion having orifices to allow the interior of said portion to communicate with the interior of the envelope, a float member adapted to be moved in the tubular guiding portion under the action of entraining liquid, the upper end of said float member having an enlarged portion to alternately rest on said upward flared end of the guiding portion and to co-operate with the recessed seating to obturate the valve seating, and ducts near the exit of said tubular guiding portion to allow rapid flow of the actuating liquid and of gases.

References Cited in the file of this patent

UNITED STATES PATENTS

| | | |
|---|---|---|
| 710,480 | Loetzer | Oct. 7, 1902 |
| 843,069 | Burdick | Feb. 5, 1907 |
| 1,159,817 | Wilkinson | Nov. 9, 1915 |
| 1,593,680 | Teter | July 27, 1926 |
| 2,475,602 | Forst | July 12, 1949 |
| 2,708,944 | Modine | May 24, 1955 |
| 2,787,376 | Coulson | Apr. 2, 1957 |

FOREIGN PATENTS

| | | |
|---|---|---|
| 6,783 | Great Britain | Mar. 30, 1893 |
| 405,411 | Germany | of 1924 |
| 669,998 | France | Aug. 12, 1929 |
| 441,795 | Great Britain | Jan. 27, 1936 |